March 29, 1960 A. F. BOFF 2,930,988

APPARATUS FOR GENERATING FREQUENCIES

Filed May 16, 1955 4 Sheets-Sheet 1

INVENTOR.
ALBERT FRANK BOFF

BY

Lippincott & Smith

ATTORNEYS

March 29, 1960 A. F. BOFF 2,930,988

APPARATUS FOR GENERATING FREQUENCIES

Filed May 16, 1955 4 Sheets-Sheet 2

INVENTOR.
ALBERT FRANK BOFF

BY Lippincott & Smith

ATTORNEYS

March 29, 1960 A. F. BOFF 2,930,988

APPARATUS FOR GENERATING FREQUENCIES

Filed May 16, 1955 4 Sheets-Sheet 3

INVENTOR.
ALBERT FRANK BOFF
BY
Lippincott & Smith
ATTORNEYS

March 29, 1960 A. F. BOFF 2,930,988

APPARATUS FOR GENERATING FREQUENCIES

Filed May 16, 1955 4 Sheets-Sheet 4

INVENTOR.
ALBERT FRANK BOFF

BY Lippincott & Smith

ATTORNEYS

United States Patent Office 2,930,988

Patented Mar. 29, 1960

2,930,988

APPARATUS FOR GENERATING FREQUENCIES

Albert Frank Boff, Montreal, Quebec, Canada, assignor to Beckman Instruments, Inc., Fullerton, Calif., a corporation of California Application May 16, 1955, Serial No. 508,764

3 Claims. (Cl. 331—38)

This invention relates to a method and apparatus for generating frequencies, and more particularly, to a method and apparatus for generating frequencies of great accuracy by the combination and division of a plurality of harmonically related frequencies which may be generated from a single accurately controlled source. The frequencies so generated from such a single source may be made available in very small discrete steps over a given range. If desired, a continuously variable source of frequencies may be added in an initial stage to make the output frequencies available continuously, with no appreciable change in the output accuracy.

There are many systems in the prior art concerned with the generation of harmonic and subharmonic frequencies from a crystal controlled or other accurate source of frequency, and with methods of combining these frequencies so as to provide a series of fixed frequencies. Generally, practical considerations with regard to tuned circuit design preclude the use of these techniques for combinations of low frequencies, so that the frequency difference between adjacent fixed frequencies is considerable. Some systems provide a method of combining a variable frequency with the aforementioned fixed frequencies to provide continuous frequency coverage. All such systems are limited in precision by the error associated with the variable oscillator component.

For example, until quite recently a common technique to secure continuous frequency coverage in frequency generating equipment was to check and adjust the frequency of an interpolation oscillator at crystal controlled calibration points, the interpolation oscillator furnishing the output frequency continuously for a given frequency range including the check points. However, this system often requires elaborate equipment and a complex adjustment to give a particular frequency. Furthermore, the interpolation oscillator is most accurate only at the calibrated check points and has less accuracy at frequencies other than those generated at these check points. A variant of this equipment is frequency measuring equipment wherein an interpolation oscillator is zero beat against an unknown frequency and then the deviation of the interpolation oscillator from the nearest crystal check point measured to give a measurement of the unknown frequency.

More recently, a new technique has found use which promises to allow more flexibility and simpler equipment. Multiple harmonics are generated and selective high-Q selection is accomplished by phase locking a variable oscillator. Frequency control in this system is obtained by mixing the output of the variable oscillator with a referenced frequency or a referenced frequency harmonic and comparing the frequency of the beat frequency generated thereby with the frequency of an interpolation oscillator. A frequency generating equipment employing this principle is shown and described in a paper entitled, "Standard Frequency Controlled Wide Range Oscillator," by E. T. Felch et al., on pages 38–42 of part 10, vol. 2, of the Convention Record of the IRE for 1954. However, frequency generating equipments employing this principle also suffer from the accuracy limitation imposed by an interpolation oscillator.

The invention herein accordingly represents a practical solution to a long existing problem in the art of frequency generation; namely, the problem of supplying a frequency having crystal controlled or similar accuracy either continuously or at small discrete intervals over a given frequency range. The present invention takes advantage of principle that an accurately controlled frequency may be divided and if the dividing means is operating reliably a frequency will be obtained at the output of the dividing means which has a percentage accuracy the same as the input frequency and an absolute accuracy as many times greater than the input frequency as the particular dividing ratio employed. Advantage is also taken of the fact that when a small approximately known frequency is added to a larger but precisely known frequency, the resultant accuracy, although equal to the arithmetic sum of the added accuracies, is nevertheless considerably improved on a percentage basis.

In the invention, a plurality of mixing and dividing stages are arranged in cascade to give a fixed range of frequencies, with either continuous frequency coverage or a very large number of discrete steps of frequency within such range, depending upon whether a continuouly variable oscillator or a series of discrete frequency steps are employed in an initial stage.

It may properly be said, accordingly, that a primary object of the present invention is to provide a method and apparatus for the generation of accurately controlled frequencies either continuously or in small discrete steps over a given range.

It is also an object of the invention to provide the aforesaid method and apparatus for the generation of accurately controlled frequencies by circuitry which employs electrical circuit components, including frequency selective circuit components, of convenient sizes, and which also, in connection with the aforesaid convenient components, generates frequencies in a practically convenient frequency range which, of course, may subsequently be shifted to other frequency ranges.

Another object of the present invention is to provide a frequency generator wherein frequencies of varying accuracies may be mixed and an output frequency generated which has an accuracy greater than some or all of such component frequencies.

Still another object of the present invention is to provide a method and apparatus for frequency generation wherein a single crystal controlled or other accurate source of frequency may provide a range of frequencies or a plurality of ranges of frequencies, and very small discrete steps of available frequency within each such range, any of the steps of frequency in any range being of the same high percentage accuracy as the single accurate source.

A further object of the invention is to provide means for generating frequencies which will greatly improve the effective accuracy of continuously variable component.

In the present invention a plurality of mixing and dividing stages are arranged in cascade. Each such mixing and dividing stage other than the first stage comprises a source of harmonically-related selectable frequencies, a mixer or modulator, a tuner, and a frequency divider. The initial stage in a preferred embodiment comprises only a source of selectable frequencies and (if convenient) a frequency divider, and in other embodiments may comprise a source of frequency which is continuously variable.

The selectable frequencies in each stage, or the continuous frequency in an initial stage, are frequencies which are conveniently described as being the arithmetical sum of two components. One such component is fixed in character and independent of the frequency being selected. When added and divided in the various stages, this fixed component in each stage produces a fixed component of the output frequency, preferably chosen so that it bears a harmonic or subharmonic relation to the accurate source frequency, and accordingly is separable by some convenient means, such as heterodyning with a harmonic or subharmonic of the accurate source frequency. For example, in a preferred embodiment of the invention which will be discussed more fully hereinafter, the fixed component of the selectable frequencies in the first stage is 100 kc. and in all other stages is 90 kc., and the division and addition of these fixed frequencies results in a fixed frequency component in the output frequency of 100 kc. The output frequencies, which accordingly are all above 100 kc., may be readily shifted downward to eliminate this 100 kc. component.

The second additive component in each stage is selectable according to the particular output frequency desired. This component in each stage is the particular additive part of the output frequency desired in the particular stage multiplied by the number of times said additive part will be divided after being generated. Where a dividing ratio of ten is employed, as in the preferred embodiment already mentioned, the second additive components are factors of ten multiplied by the particular additive part of the final frequency being generated in the particular stage.

The fixed frequency increment added in each stage solves the problems of separation at low frequencies. The cascade arrangement of stages makes it possible in each stage to separate out, with circuitry employing conventional components and sizes, the desired mixing product arising from the mixing of the selected frequency and the divided frequency from the previous stage. In addition, the cascade arrangement and the dividing ratio afford the necessary total dividing ratios with an economical number of stages. The relation between the incremental addition and the dividing ratios is also designed to keep the tuning means employed to effect the selection of the desired mixing product in each stage simple and conventional.

Advantages and objects of the present invention, in addition to those already enumerated hereinabove or apparent from the foregoing summary, will be readily discovered by those skilled in the art from the following drawings and description, illustrating various features and embodiments of the invention.

Figure 1:
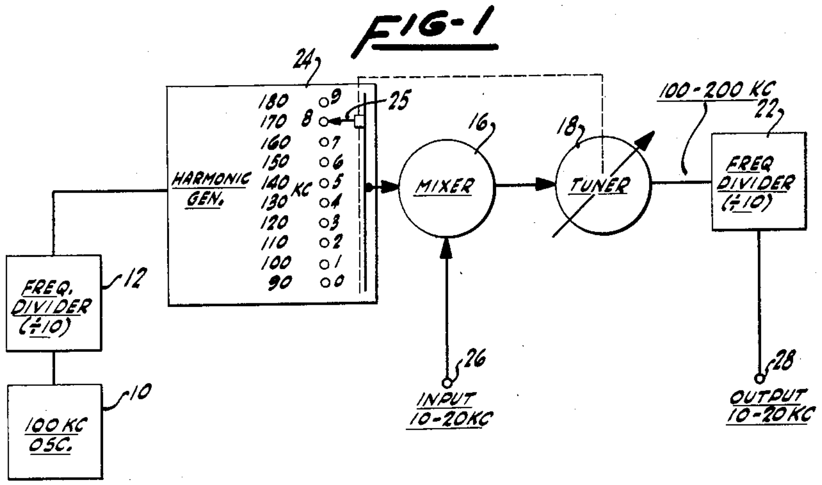
Fig. 1 is a schematic diagram in block form illustrating the method of mixing and dividing two frequencies and securing an output frequency.
Figure 3:
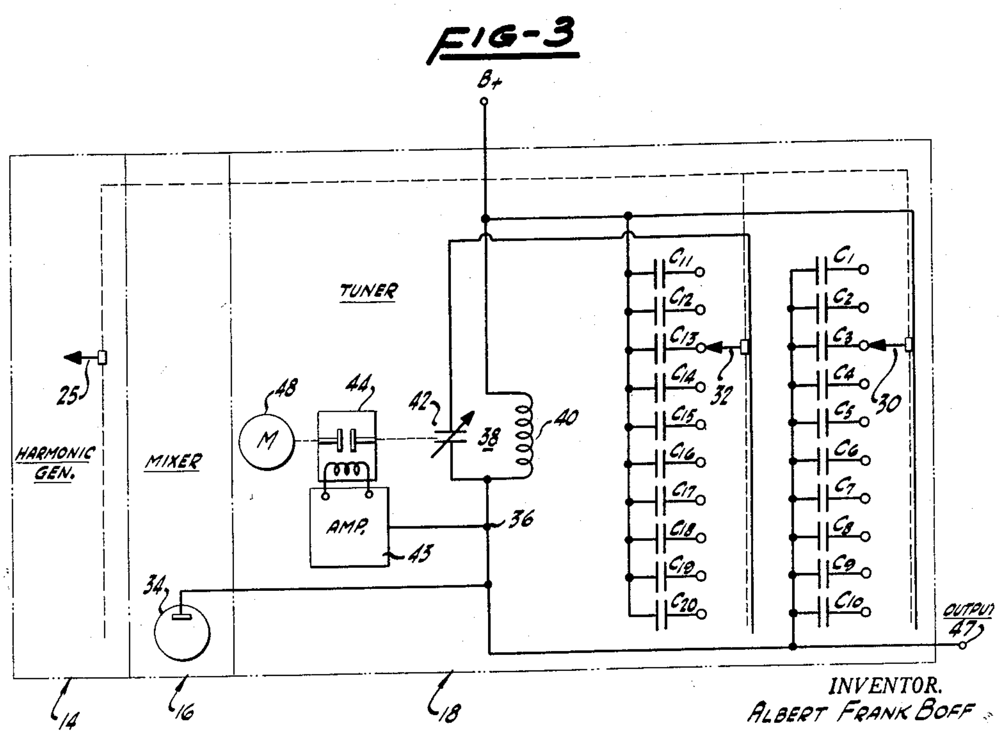
Fig. 3 is a schematic diagram, partially in block form, illustrating a method and apparatus for selecting the desired mixing or modulation product in each stage.
Figure 4:
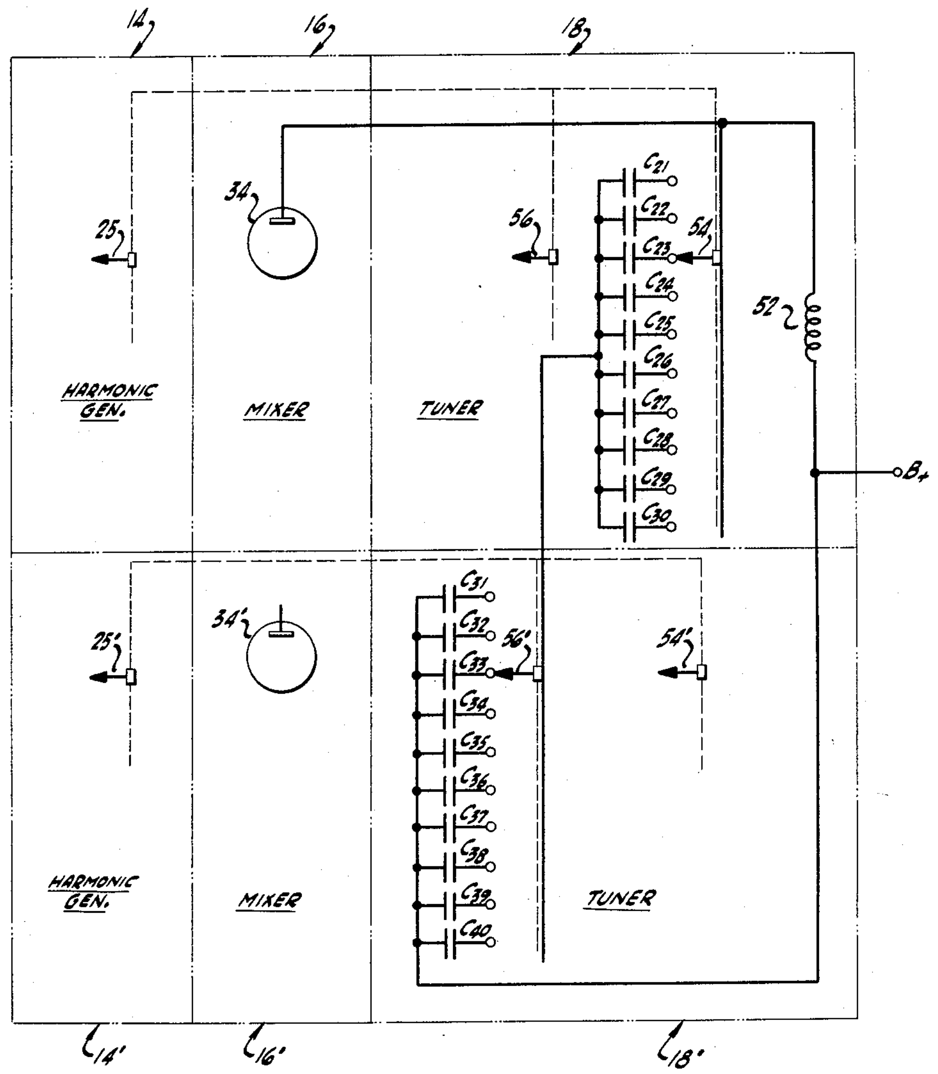
Fig. 4 is a schematic diagram, partially in block form, illustrating another method and apparatus for selecting the desired mixing or modulation product in each stage.

Referring first to Fig. 1, a preferred embodiment of a single stage of the frequency generator is there depicted. A 100 kc. oscillator 10, which is preferably crystal controlled or of similar accuracy, is connected to a frequency divider 12. Frequency divider 12 divides the 100 kc. frequency provided by oscillator 10 by ten and produces a frequency of 10 kc. at its output. Frequency divider 12 may be any of the known types of frequency divider, so long as it operates reliably and may, for example, be a decade counting unit. No indication of the count is necessary if a decade counter is used for frequency divider 12. The 10 kc. output from frequency divider 12 is introduced to a harmonic generator 24. Harmonic generator 24 is arranged to generate reference frequencies separated by 10 kc. intervals in the range of 90 to 180 kc. and may be any of the types known to the art. Three types of harmonic generators that may be used are, for example, a class C amplifier or square wave generator in combination with selective circuits, a pulse generator and high-Q tuned circuits, or two modulators connected as Vos de Wael describes in pages 807–813 of volume 40, No. 7 of the Proceedings of the IRE (July 1952). A switch 25 is shown as the means of selecting the particular frequency to be introduced to the mixer 16, which mixer 16 may be any of the known types of modulator or mixer. Switch 25 is shown for convenience only and may be replaced by a tuned circuit or other means of frequency selection appropriate to the type of harmonic generator used. The frequency selected by switch 25 is introduced to mixer 16 simultaneously with a second frequency which is connected to terminal 26. Using F1 to represent the frequency introduced from the harmonic generator and F2 to represent the frequency introduced via terminal 26, the main frequency products produced by the mixer are F1, F2, $F1+F2$, and $F1-F2$, unless, of course, mixer 16 is of the double balanced type in which case F1 and F2 are absent from the output. The output of mixer 16 is introduced to tuner 18 which is arranged to select a modulation product representative of both frequencies which were introduced into mixer 16; i.e., one of the two second-order sidebands, $F1+F2$ or $F1-F2$. Tuner 18 is shown ganged to switch 25 of harmonic generator 24. This is to represent that some component or components of the tuner 18 are preferably varied simultaneously with switch 25 of harmonic generator 24 to select the desired mixing product. Tuner 18 may take any of a number of forms. Two such forms, for example, are illustrated in Figs. 3 and 4 and will be more fully described hereinafter. The particular mixing product selected by tuner 18 is introduced to a frequency divider 22 where it is divided by some convenient ratio, such as ten, and the output made available on terminal 28.

Assuming that switch 25 is set, as shown, to select a frequency of 170 kc., and that tuner 18 is ranged to select the sum frequency produced by the mixer (that is, $F1+F2$), the operation of the circuit of Fig. 1 is as follows: A 100 kc. frequency is produced by oscillator 10 and is divided by ten in frequency divider 12 to produce a 10 kc. input to harmonic generator 24. Harmonic generator 24 generates 170 kc., the 17th harmonic of the 10 kc. input, which is selected by switch 25 and introduced to mixer 16. For the purposes of this discussion we will assume that the frequency introduced on terminal 26 is continuously variable between 10 and 20 kc. The output of the mixer, including the sum frequency ($F1+F2$) is introduced to tuner 18. In tuner 18 all but the sum frequencies are eliminated or greatly attenuated in amplitude. Accordingly, only the frequencies of 180 to 190 kc. are available at the output of tuner 18, the exact frequency between these limits depending upon the frequency being introduced upon terminal 26. Divider 22 divides the particular frequency lying in the 180 to 190 kc. range by ten, producing an output frequency on output terminal 28 lying in the range of 18 to 19 kc.

The 170 kc. frequency selected by switch 25 of harmonic generator 24 has the same percentage accuracy as the 100 kc. oscillator 10. Oscillator 10 is preferably a crystal controlled or other accurate type. Accordingly, the 170 kc. frequency selected by switch 25 is of high accuracy. On the other hand, the accuracy of the 10 to 20 kc. frequency introduced to terminal 26 will depend upon a number of factors, such as the calibration of the continuously variable source, its stability and accuracy, etc., and ordinarily will not be of as high a percentage accuracy as the frequency generated by the harmonic generator 24. Assuming that the 170 kc. frequency, for example, has an accuracy of .01% and the variable frequency introduced on terminal 26 has an accuracy of 0.1%, a frequency will be generated at the output having an accuracy of not less than .0195%. This, of course, is a considerable improvement over the 0.1% accuracy of the variable frequency introduced on terminal 26. In fact, the accuracy of the frequency component of the output produced by the frequency introduced on terminal 26 is now approximately of the same order as the accuracy of the component produced by harmonic generator 24. As the position of switch 25 is varied from the 90 kc. step to the 180 kc. step of harmonic generator 24, the frequencies available at output terminal 28 range from 10 to 20 kc. Thus it is shown that by combining the continuously variable frequency on terminal 26 with an accurate frequency selected by switch 25, an output frequency is produced at terminal 28 which has an accuracy much greater than the variable frequency on terminal 26 but which still covers the same continuous range of frequencies as the input frequency on terminal 26.

Further stages such as the stage depicted in Fig. 1, each having a 10 to 20 kc. output such as that available on terminal 28, and having that output introduced to the succeeding mixers in place of the continuously variable input shown on terminal 26 will improve the accuracy further. The accuracy of the 100 kc. oscillator 10 is the limiting accuracy of this system.

Figure 2:
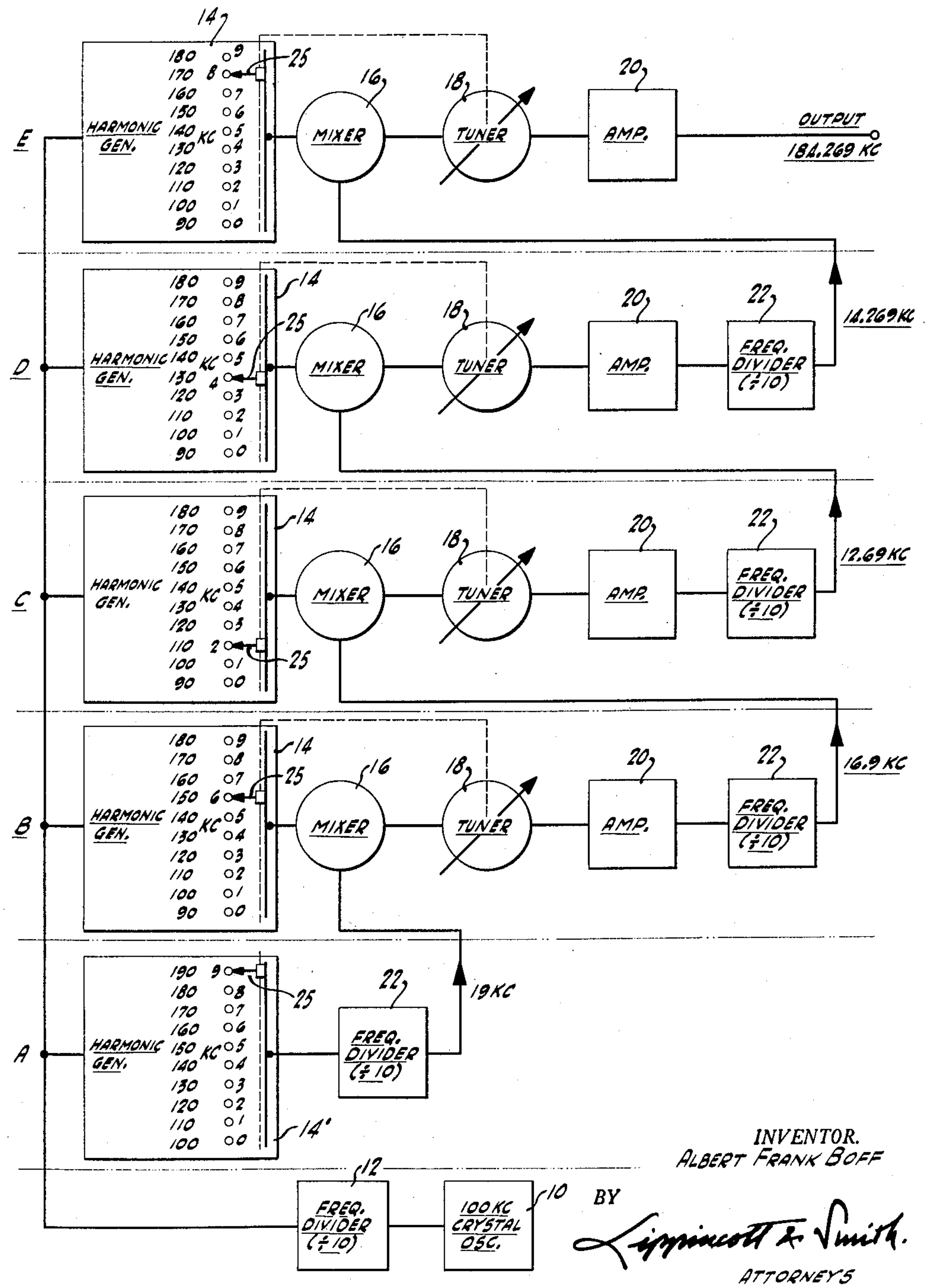
Fig. 2 is a schematic diagram in block form of a preferred embodiment of the invention arranged to generate frequencies separated by discrete steps of one cycle in the range of 100–200 kc.

Turning now to Fig. 2, a preferred embodiment of the invention arranged to generate a range of frequencies from 100 to 200 kcs. in discrete steps of one cycle is there shown. It will be noted that the embodiment shown in Fig. 2 employs no continuously variable oscillator component. In Fig. 2 a 100 kc. crystal oscillator 10 generates an accurately controlled 100 kc. frequency which is introduced to frequency divider 12. Crystal oscillator 10 may, of course, be replaced by other types of oscillators. Frequency divider 12 is arranged to divide the 100 kc. frequency by ten and produce at its output a 10 kc. frequency. This 10 kc. frequency is introduced to each of five harmonic generators 14 in each of five stages A, B, C, D, and E. The harmonic generator 14 in each of these stages is arranged to generate the harmonics shown in Fig. 2, i.e., the harmonic generator 14 in stage A generates the 10th through the 19th harmonics of the 10 kc. input frequency. It will be noted that the stages B, C, and D are identical. Stage A, on the other hand, has a harmonic generator 14' which generates a range of harmonics one harmonic higher than the other harmonic generators 14, and furthermore, the stage A requires only a harmonic generator 14' and a frequency divider 22. Stages B, C, and D comprise a harmonic generator 14, a mixer 16, a tuner 18, a frequency divider 22 and preferably an amplifier 20. Stage E comprises a harmonic generator 14, a mixer 16, a tuner 18, and preferably an amplifier 20. The output of each stage is connected to the mixer 16 of the next succeeding stage. The harmonic generator 14 depicted in each stage of Fig. 2 is the same as the harmonic generator 14 depicted in connection with Fig. 1, as are also the mixer 16, the tuner 18, and the frequency divider 22. Amplifier 20 is any type of amplifier which will amplify the frequencies concerned and may be a type which amplifies only signals above a certain level, such as a class C amplifier, to eliminate residual frequency components, if any, not eliminated in tuner 18.

Bearing in mind that the particular frequency chosen is only for the purpose of illustration, the operation of the frequency generator shown in Fig. 2 is as follows: Switches 25 of the harmonic generators 14 are shown in a position to generate a frequency of 184,269 cycles. Oscillator 10 produces a 100 kc. frequency which is divided by frequency divider 12 to produce a frequency of 10 kc. This 10 kc. frequency drives the harmonic generators 14 in stages A, B, C, D, and E to produce the frequencies as already noted. A frequency of 190 kc. is produced by harmonic generator 14' of stage A and is selected by switch 25. This 190 kc. frequency is introduced to frequency divider 22 of stage A to produce an output frequency of 19 kc. The harmonic generator 14 of stage B generates a frequency of 150 kc. which is selected by switch 25 and introduced to mixer 16 of stage B. The 19 kc. frequency from stage A is also introduced to this mixer 16. Tuner 18 in all stages, including stage B, is preferably arranged to select the sum frequency produced in the respective mixer 16, as this arrangement produces the largest difference between adjacent modulation products for a given dividing ratio and simplifies tuner 18 design. Accordingly tuner 18 of stage B selects the 169 kc. frequency product of mixer 16. This 169 kc. frequency is amplified in amplifier 20 and divided by frequency divider 22 of stage B to produce a 16.9 kc. frequency. The harmonic generator 14 of stage C is generating a 110 kc. frequency which is selected by switch 25 and mixed in mixer 16 of stage C with the 16.9 kc. frequency produced by stage B. In a manner similar to that already described for stage B, stage C produces an output frequency of 12.69 kc. This frequency is mixed in mixer 16 of stage D with a 130 kc. frequency selected by switch 25 of harmonic generator 14 of stage D. In a manner similar to that already described for stages B and C, stage D produces a frequency of 14.269 kc. at its output. This 14.269 kc. is combined in the mixer 16 of stage E with a 170 kc. frequency selected by switch 25 of harmonic generator 14 of stage E and a frequency produced at the output of amplifier 20 of 184,269 cycles per second. The percentage accuracy of this output is the same as the accuracy of oscillator 10.

By adding a frequency divider 22 to stage E, this frequency will be reduced to 18,426.9 cycles per second, and the range of the frequency generator will be changed to 10 to 20 kc., in available steps of 0.1 cycle per second. The percentage accuracy of this output will be the same as the accuracy of oscillator 10, as before.

The arrangement shown in Figs. 1 and 2 which generates the 10 kc. input to the various harmonic generators 14 is of course only one of the possible arrangements. A 10 kc. frequency may be generated and fed directly to the various harmonic generators 14 and frequency divider 12 omitted, or the 10 kc. frequency may be generated in the harmonic generators themselves and both oscillator 10 and frequency divider 12 omitted. Another arrangement whereby the needed frequencies may be made available at the various stages is to employ only a single harmonic generator to generate a range of harmonics from 90–190 kc. separated by increments of 10 kc., and then introduce these frequencies to a frequency selecting switch or tuning system in each stage through a system of isolating impedances, such as capacitors or resistances. Harmonic generator 14 or its equivalent in such an embodiment should have a low internal output impedance to avoid undue coupling between the various stages when the harmonic selector switches or tuners in two or more stages are set to select the same harmonic frequency. The small amounts of interstage coupling arising in this type of embodiment under these circumstances are easily eliminated by some form of threshold action in the mixers 16, the amplifiers 20, or the frequency dividers 22, any of which may have, for example, the same threshold types of action already mentioned in connection with the amplifiers 20.

The harmonic generators 14 may also be replaced by a single frequency generator in each of the stages, with or without a single stable frequency, such as the 10 kc.

frequency of Fig. 2 to drive or control the single frequency generated. A preferred embodiment of this type is a plurality of oscillators, one in each stage, having their frequency controlled by a means such as phase locking with the 10 kc. accurately controlled frequency.

The harmonic generator 14', or both of the harmonic generator 14' and the frequency divider 22, of stage A may be replaced by a continuously variable oscillator as already explained in connection with Fig. 1. In such an embodiment, the output frequency is continuously variable over the 100–200 kc. range. Since the output of the initial stage A contributes only about one part in ten thousand to the output frequency of the final stage E, any reasonable reduction in the accuracy of stage A will have a negligible effect upon the over-all accuracy of the output frequency. Furthermore, the variable component will provide several significant figures in the output frequency.

Variation in the fixed increment or lowest frequency added in each stage of Fig. 2 is possible. For example, minimum frequences of 100 kc. may be added in stage A, 190 kc. in stage B, 80 kc. in stage C, 90 kc. in stage D, and 90 kc. in stage E, and if the frequencies corresponding to the sum frequencies are selected by the tuner 18 in each stage and a dividing ratio of ten employed as before the same output frequencies will be obtained. However, the internal tuning components of tuner 18 in this embodiment will necessarily vary from stage to stage.

The embodiment of the invention illustrated in Fig. 2 employs a dividing ratio in each stage of 10. The ratio of 10 gives a straightforward design. However, other dividing ratios may be used as well. If, for example, a dividing ratio of 20 is used and the sum frequency selected by tuner 18 as before, the fixed frequency component added in stage A may be 200 kc. and the fixed frequency component, added in stages B, C, D, and E may be 190 kc. This produces a fixed frequency increment at the output of 100 kc. as before. Or 400 kc. might be added in stage A, 180 kc. in stage B, 390 kc. in stage C, 380 kc. in stage D, and 180 kc. in stage E, for the same result. The selectable portions of the frequencies available in each stage must be 16 times their former value in stage A, 8 times their former value in stage B, 4 times their former value in stage C, two times their former value in stage D, and their former value in stage E. For example, in the embodiment of Fig. 2, employing a dividing ratio of 20 instead of 10, and adding incremental frequencies in accordance with the last example of incremental addition, a frequency of 184.269 kc. would be generated by settings of 1840 kc. in stage A, 660 kc. in stage B, 470 kc. in stage C, 460 kc. in stage D, and 260 kc. in stage E.

It is also possible to vary the dividing ratio from stage to stage, but due to the variation in tuning components and ranges of selectable harmonics from one stage to another required by such variation, such embodiments are not as economical and practically feasible as the embodiments of the invention having a constant dividing ratio.

As was pointed out in connection with the description of Fig. 2 hereinabove, tuner 18 in each stage is preferably arranged to select the upper sideband or sum frequencies, thereby producing the largest difference between adjacent modulation products for a given dividing ratio, and facilitating the design of tuner 18. However, the difference frequencies may be selected as well by tuner 18. In such a case, the fixed frequency component of the selectable frequencies for a dividing ratio of 10 as illustrated may be 110 kc. in stages B, C, D, and E, and 100 kc. in stage A. The selectable portions do not change in this embodiment from those of Fig. 2.

The frequency in the final stage may or may not be comprised of a desired component with an incremental addition. No incremental addition is absolutely necessary since there is no following stage where frequency separation will be required. In either case, as already noted, the frequency selected in the mixing process in the final stage may or may not be divided. The final stage where there is no such division, such as, for example, in Fig. 2, may be thought of as a means of shifting the output of the previous stage by heterodyning.

Generalized formulae may be developed for the particular set or sets of selectable harmonic frequencies required for a given embodiment where the other factors, such as the dividing ratio, the number of stages, and the ultimate available increments of frequency are known. The particular harmonic selected will of course depend upon the particular available output frequency desired. Letting A, B, C . . . M be the dividing ratios in the respective stages, $a$ be the increment of frequency from one available output to the next, $n$ be the number of stages, and $k_1$, $k_2$, etc. be integers, then a first digit $p$ of an ordinal number representing a desired frequency will be produced by generating in the first stage a frequency $pa(A \times B \times \ldots M) + ak_1 A 10^n$. The second digit $q$ will be generated by generating a frequency in the second stage of $qa(B \times C \ldots M) \times 10 + ak_2 B 10^n$.

The cascade arrangement in combination with the added fixed incremental component in each stage makes it possible to separate out the unwanted frequencies arising from the mixing or adding process in the various stages. Referring to the above formulae, this means that $$B[qa(C \times D \times \ldots M) + ak_2 10^n] \pm [pa(B \times C \times \ldots M) + ak_1 10^n]$$

must be separable from $$B[qa(C \times D \times \ldots M) + ak_2 10^n]$$

It follows, for example, in an embodiment employing unbalanced modulators and tuning the sum frequencies, where A, B, C . . . M all equal 10, and $k_1$, $k_2$, etc. equal 1, such as Fig. 2, the closest frequency products requiring separation will have a ratio of 18:1, which condition will obtain when $p=0$ and $q=9$. Frequencies bearing this ratio are easily separable with standard components and design.

Tuner 18 in stages B, C, D, and E is shown ganged with switch 25 of harmonic generator 14 to indicate that preferably a variation in switch 25 position introduces either an electrical or a mechanical variation in some component of tuner 18, automatically selecting the desired sideband. Separate tuning of tuner 18, without regard to switch 25, is possible, but adds to the adjustments necessary to select a given frequency.

Fig. 3 illustrates a preferred embodiment of tuner 18. In Fig. 3, switch 25 of harmonic generator 14 is ganged with switch arms 30 and 32 in tuner 18. Tuned circuit 38 of tuner 18 is shown in the plate circuit of mixer 16. In other types of mixer 16, tuned circuit 38 may be in series with the output or in other effective points of the circuit. Switch arm 30 is arranged to connect various capacitors, designated C1, C2, C3, etc., in parallel with variable capacitor 42 of tuned circuit 38. Switch arm 32 is arranged to connect a second series of capacitors, designated by C11, C12, and C13, etc., in series with variable capacitor 42 of tuned circuit 38.

The capacitors selected by switch arms 30 and 32 are chosen so that, with variable capacitor 42 and inductor 40, a frequency band may be tuned which is limited to the possible sum products of the mixer for the particular frequency selected by switch 25. Capacitor 42 is then varied to cover the possible sum frequencies. In the embodiment illustrated in Fig. 3 tuned circuit 38 will cover a band of frequencies beginning at 10 kc. higher and ending 20 kc. higher than the frequency selected by switch 25, this band including all the possible sum frequency products. Amplifier 43 is connected to a point 36 between the mixer 16 and tuned circuit 38. The output of amplifier 43 is connected to a magnetic clutch 44. Magnetic clutch 44 connects and disconnects motor 48 from a shaft which varies the capacity of variable capacitor 42.

Amplifier 43 is arranged to amplify, without regard for frequency, the signal appearing at point 36. The output of amplifier 43 is connected to magnetic clutch 44 and is arranged to energize magnetic clutch 44 until the voltage at the mixer 16 has fallen to a minimum value, indicating that tuned circuit 38 is in resonance. Inasmuch as tuned circuit 38 can only resonate at the sum frequency, a maximum amplitude of this frequency will then be available at output terminal 47. Tuned circuit 38 will offer low impedance to the other frequencies produced by mixer 16, substantially bypassing such frequencies to ground through the B+ power supply and eliminating them.

The amplifier 43, arranged to operate as an amplitude detector as described hereinabove, is only one of the possible automatic tuning methods which may be used. For example a phase detector and amplifier may be used at 43 instead of an amplifier 43 as already described. In another embodiment, the output of amplifier 43 may be arranged to directly control motor 48, and magnetic clutch 44 omitted. However, the embodiment shown in Fig. 3 has the advantage that only one motor 48 is necessary for a plurality of tuners 18. Other means of automatic tuning are well known to the art and may be employed, such as reactance tube tuning, or a voltage sensitive capacitor (dielector), or automatic tuning employing a heat sensitive element, and so forth. The circuitry in any of these cases is analagous to that shown in Fig. 3.

Fig. 4 illustrates another embodiment of tuner 18. In Fig. 4 the capacitors C21, C22, C23, etc. are chosen of a small enough capacitance so that they are the main frequency determining capacitor, in conjunction with inductor 52, of the tuned circuit comprised of inductor 52, capacitors C21, C22, C23, etc., and capacitors C31, C32, C33, etc. Capacitors C31, C32, C33, etc. on the other hand, are of a larger capacitance, and in the series connection employed, have a correspondingly smaller effect on the frequency at which the inductor 52 and the smaller capacitances C21, C22, C23, etc. will resonate. The main frequency determining capacitances C21, C22, C23, etc. are switched into the circuit by switch arm 54 which is ganged with switch arm 25 of the harmonic generator 14 of the same stage as the tuner 18. The capacitors having the smaller effect on the frequency C31, C32, C33, etc. are switched into the circuit by switch arm 56′ which is ganged to switch 25′ of the previous stage. The ratios of C21, C22, C23, etc., as compared to C31, C32, C33, etc., are chosen so that the resonant circuit comprised of these capacitors and inductor 52 is approximately resonant at the particular sum frequency involved at the corresponding switch 25 and switch 25′ positions. This arrangement gives rise to small inaccuracies as the switch arms 54 and 56′ are varied with respect to each other, and the tuned circuit formed by the capacitors selected and inductor 52 must have a low enough Q so that these small inaccuracies will not be distinguished; i.e., in the typical embodiment shown, the tuned circuit formed as aforesaid should have a somewhat broader selective characteristic than the tuned circuit 38 of Fig. 3. Further switching sections may of course be added to connect additional tuning elements on the various settings and reduce the aforesaid small inaccuracies. The arrangement of Fig. 4 is particularly useful in connection with embodiments of the invention employing balanced modulators or mixers 16, as the modulations products are more widely separated in frequency in such modulators.

In another embodiment of tuner 18, not illustrated herein, switch 25 is ganged to a switch which connects a series of bandpass filters between mixer 16 and amplifier 20 in each stage, the bandpass filter being arranged to pass a band of frequencies containing all the possible sum or difference components, whichever is desired in the particular embodiment. However, such an arrangement requires 10 bandpass filters for each stage, each with a somewhat steep skirt and consequently is somewhat more complex than the arrangements already shown and described.

Another type of tuner 18 that may be used in the invention is a mechanical tuning arrangement, such as the series of cams shown in United States Patent No. 2,648,006. Other arrangements for tuner 18 will occur to those familiar with the art.

Figure 5:
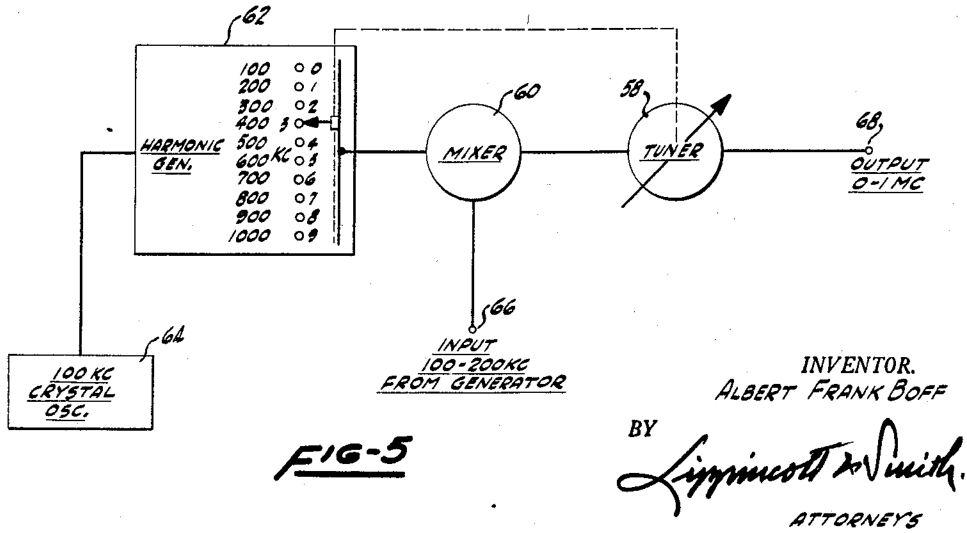
Fig. 5 is a schematic diagram in block form illustrating a method and apparatus for shifting the range of output frequencies, which may be employed to create new ranges of output frequencies.

Referring now to Fig. 5, a mixing or heterodyning means of extending the range of the 100 to 200 kc. available from the frequency generator of Fig. 2 to the range of zero to 1 mc. is there illustrated. Fig. 5 is, of course, only one of the possible arrangements. A 100 kc. crystal oscillator 64, which is preferably the same oscillator employed to generate the 100 to 200 kc. band shown at the input terminal 66, is used to drive a harmonic generator 62 which produces the harmonics shown, i.e., from 100 to 1000 kc. in 100 kc. increments. The output of harmonic generator 62 is connected to a mixer 60, and the 100 to 200 kc. frequencies are introduced via input terminal 66 and also connected to mixer 60. The output of mixer 60 is connected to a tuner 58 which, in the embodiment shown, is arranged to select the difference frequencies; accordingly, a range of frequencies from zero to 1000 kc. or 1 mc. is available on output terminal 68. The circuit of Fig. 5 operates as already described in connection with Figs. 1 and 2.

Figure 6:
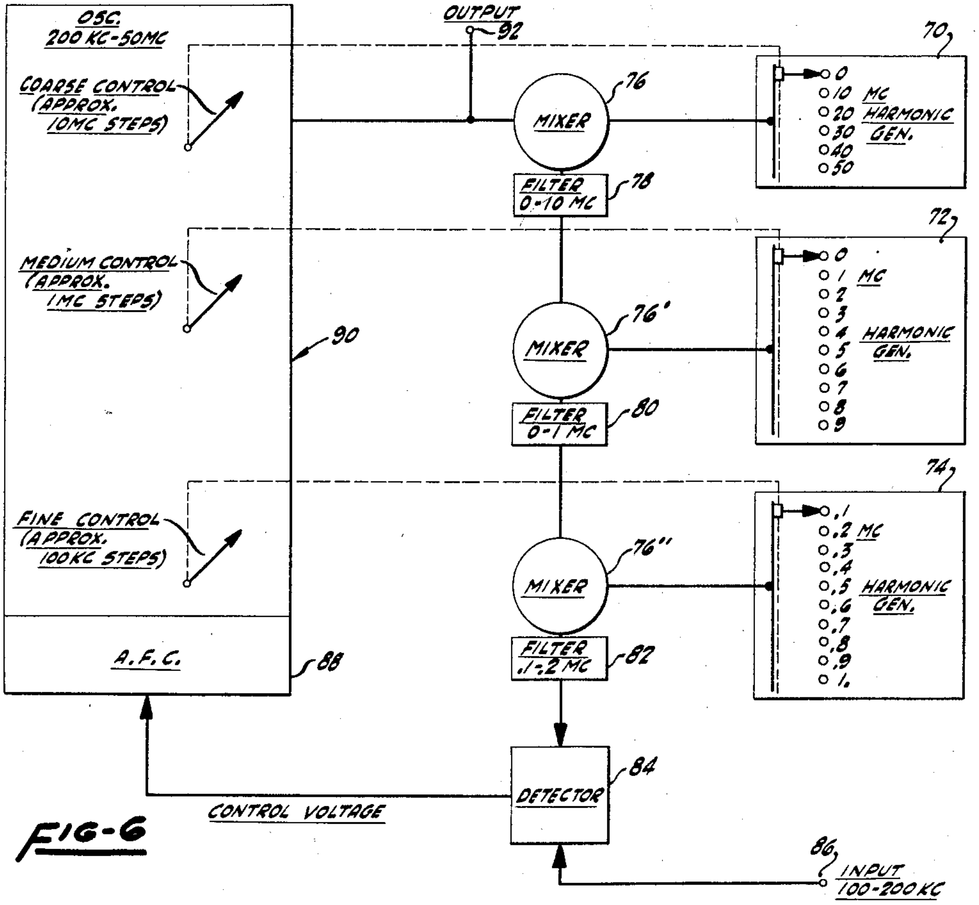
Fig. 6 is a schematic diagram in block form illustrating another method and apparatus for creating new ranges of output frequencies.

Fig. 6 depicts a particular embodiment of another method and apparatus for extending the range of a frequency generator such as the 100–200 kc. frequency generator of Fig. 2 which employs phase locking in a manner somewhat analagously to the oscillator shown in a paper entitled "Standard Frequency Controlled Wide Range Oscillator," by E. T. Felch et al., pages 38–42, part 10, vol. 2 of the Convention Record of the IRE for 1954. Referring to Fig. 6, a continuously variable oscillator 90 is equipped with an automatic frequency control 88. Oscillator 90 and a harmonic generator 70 are connected to mixer 76. The output of mixer 76 is connected through a 0 to 10 mc. filter 78 to a second mixer 76′. Also connected to the second mixer 76′ is a harmonic generator 72. The output of mixer 76′ is connected through a 0 to 1 mc. filter 80 to mixer 76″. Also connected to mixer 76″ is a harmonic generator 74. The output of mixer 76″ is connected through a .1 to .2 mc. filter to a phase detector 84. Also connected to phase detector 84 via input terminal 86 is a 100–200 kc. frequency from the frequency generator whose range is to be extended, which may be, for example, a frequency generator such as that shown in Fig. 2. The control voltage developed by phase detector 84 is connected to the automatic frequency control 88 associated with oscillator 90. Harmonic generator 70 is arranged to generate frequencies from 0 to 50 mc. in increments of 10 mc. The means of controlling the frequencies produced by harmonic generator 70 is ganged to the coarse control of oscillator 90. The coarse control of oscillator 90 is arranged to vary the frequency of oscillator 90 in approximately 10 mc. steps, corresponding to the steps of frequency generated by harmonic generator 70. Harmonic generator 72 is arranged to generate frequencies of 0 to 10 mc. in one megacycle steps, and is similarly ganged to the medium control of oscillator 90, which medium control is arranged to vary the frequency of oscillator 90 in corresponding 1 mc. steps. Harmonic generator 74 is arranged to generate frequencies of from .1 to 1.1 mc. in 100 kc. steps and is similarly ganged to the fine control of oscillator 90, which controls the frequency of oscillator 90 in approximately 100 kc. steps, these last steps being 100 kc. higher than the corresponding harmonic generator 74 steps.

Assuming that a frequency of 45,967,231 c.p.s. is to be generated, the operation of the arrangement of Fig. 6 is as follows: The coarse control of oscillator 90 is placed on its 40 mc. setting, the medium control is placed on its 5 mc. setting, and the fine control is placed on its 900 kc. setting. Neglecting, for the moment, the effect of automatic frequency control 88, oscillator 90 will initially be generating a frequency of approximately 45,900,000 c.p.s. Harmonic generator 70 will be on its 40 mc. setting since it will correspond to the coarse control setting, and mixer 76 will accordingly have frequencies of 45.9 mc. and 40 mc. introduced to it. Among the frequencies produced by mixer 76 will be the sum frequency 85.9 mc. and the difference 5.9 mc. Only the 5.9 mc. frequency will pass through filter 78. Harmonic generator 72 will be generating 5 mc. and this will be mixed in mixer 76' with the 5.9 mc. passed by filter 78. Among the frequencies produced will be the sum frequency of 10.9 mc. and the difference frequency .9 mc. Filter 80 will pass only the .9 mc. frequency. Harmonic generator 74 will be generating a frequency of .8 mc. and this will be mixed in mixer 76'' with the .9 mc. passed by filter 80. Among the products of mixer 76'' will be the sum frequency 1.7 mc. and the difference frequency .1 megacycles. Only the .1 mc. frequency will be passed by filter 82 and this .1 mc. will be the input to phase detector 84 from filter 82. In order to generate the 45,967,231 cycle frequency postulated hereinabove, a frequency of 167,231 c.p.s. will be introduced upon input terminal 86. This frequency is connected to phase detector 84 and will result, since there is a .1 mc. input from filter 82, in frequency and phase differences and cause a control voltage to be developed by phase detector 84. This control voltage is applied to automatic frequency control 88 and results in the frequency generated by oscillator 90 being shifted in an upward direction. This upward shift or increase in the frequency continues until a frequency of 45,967,231 is being generated by oscillator 90, at which time a difference frequency is being produced in mixer 76'' of 167,231 c.p.s. When this occurs, phase detector 84 will have a stabilized output and the frequency of oscillator 90 will be phase locked in synchronization with the frequencies produced by the harmonic generators 70, 72, 74 and the frequency introduced on terminal 86. Oscillator 90 is arranged to deliver its output to an output terminal 92 as well as to mixer 76.

The embodiment shown in Fig. 6 is, of course, subject to variation in components and connections that will be readily apparent to those skilled in the art. Other methods of extending the range of a frequency generator such as that illustrated in Fig. 2 are known to the art, such as, for example, straight multiplication or division, as the desired range may require, of the frequency produced in the frequency generator.

The embodiments of the invention above illustrated and described are intended to be merely illustrative, and other arrangements and components will occur to those familiar with the art which will give the same result and which are within the scope of the invention herein, which is defined in the following claims. I claim:

1. A high-precision variable-frequency signal generator comprising a signal source for supplying a fixed-frequency electric signal, a plurality of successive harmonic generators connected in parallel to said source and each adjustable to provide an electric signal having a frequency equal to any selected one of several harmonics of said fixed-frequency signal, a plurality of mixers connected to respective ones of said harmonic generators for amplitude-modulating the signals provided thereby to produce sum-frequency and difference-frequency sidebands, a plurality of frequency-selective tuners connected to respective ones of said mixers for transmitting only said sum-frequency sidebands, a plurality of frequency dividers connected to respective ones of said tuners for providing signals subharmonically related to said sum frequencies, and circuit connections for transmitting such sub-harmonically related signals from each of said dividers to the mixer for modulating the signal provided by the next succeeding one of said harmonic generators.

2. A variable-frequency signal generator, comprising a source for supplying an electric signal having a known fixed frequency, adjustable ratio means connected to the aforesaid source for supplying a signal equal in frequency to any one, selectively, of a plurality of known multiples of said fixed frequency, a calibrated source for supplying an electric signal having a known variable frequency within the frequency range between one and two times said fixed frequency, frequency-adding means connected to said adjustable means and to the last-mentioned source for supplying a signal having a frequency equal to the sum of said variable frequency and the selected multiple of said fixed frequency, and fixed-ratio frequency-dividing means connected to said adding means for providing an output signal having a frequency equal to a known fixed submultiple of said sum.

3. A signal generator as defined in claim 2, wherein said plurality of multiples are the ninth through the eighteenth, inclusive, said variable frequency is variable over the frequency range between said fixed frequency and twice said fixed frequency, and said submultiple is one-tenth.

References Cited in the file of this patent

UNITED STATES PATENTS

| | | |
|---|---|---|
| 2,581,594 | MacSorley | Jan. 8, 1952 |
| 2,617,039 | Young | Nov. 4, 1952 |
| 2,660,708 | Nakken | Nov. 24, 1953 |